(12) United States Patent
Buhr

(10) Patent No.: US 10,912,991 B2
(45) Date of Patent: Feb. 9, 2021

(54) PORTABLE GAME CONTROLLER SETTINGS

(75) Inventor: Brian Douglas Buhr, San Diego, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 367 days.

(21) Appl. No.: 12/634,653

(22) Filed: Dec. 9, 2009

(65) Prior Publication Data

US 2011/0136568 A1 Jun. 9, 2011

(51) Int. Cl.
| | |
|---|---|
| A63F 13/22 | (2014.01) |
| A63F 13/95 | (2014.01) |
| A63F 13/92 | (2014.01) |
| A63F 13/235 | (2014.01) |
| A63F 13/73 | (2014.01) |
| A63F 13/42 | (2014.01) |
| A63F 13/79 | (2014.01) |

(52) U.S. Cl.
CPC ............ *A63F 13/22* (2014.09); *A63F 13/235* (2014.09); *A63F 13/42* (2014.09); *A63F 13/73* (2014.09); *A63F 13/79* (2014.09); *A63F 13/92* (2014.09); *A63F 13/95* (2014.09); *A63F 2300/1018* (2013.01)

(58) Field of Classification Search
USPC ................................................... 463/36–39
See application file for complete search history.

(56) References Cited

U.S. PATENT DOCUMENTS

| | | | | |
|---|---|---|---|---|
| 5,451,053 | A | * | 9/1995 | Garrido ........................... 463/38 |
| 5,896,125 | A | | 4/1999 | Niedzwiecki |
| 5,991,431 | A | * | 11/1999 | Borza et al. .................. 382/127 |
| 6,071,194 | A | * | 6/2000 | Sanderson et al. ............. 463/37 |
| 6,203,432 | B1 | * | 3/2001 | Roberts et al. ................. 463/37 |
| 6,213,880 | B1 | * | 4/2001 | Sim ................................. 463/37 |
| 6,710,766 | B1 | * | 3/2004 | Ogata ........................... 345/156 |
| 6,811,490 | B2 | | 11/2004 | Rubin |
| 7,116,310 | B1 | * | 10/2006 | Evans et al. .................. 345/156 |
| 7,233,904 | B2 | | 6/2007 | Luisi |

(Continued)

FOREIGN PATENT DOCUMENTS

| | | |
|---|---|---|
| CN | 1554165 A | 12/2004 |
| CN | 1655119 A | 8/2005 |
| WO | WO2011/071614 | 6/2011 |

OTHER PUBLICATIONS

International Search Report and Written Opinion in International Application No. PCT/US2010/055177, dated Jan. 11, 2011.

(Continued)

*Primary Examiner* — Jay Trent Liddle
(74) *Attorney, Agent, or Firm* — Penilla IP, APC

(57) ABSTRACT

A player of a video game, whether a freestanding system or an online gaming platform, is able to customize game controller behavior based on his/her preference, regardless of the particular game controller he/she is using. A game controller settings store is provided for storing customized game controller mappings. The game controller settings store is separate from the game controller and is accessible using different game controllers, so that a player can leave his/her game controller at one location and use a different game controller, at a different location, while still having access to the his/preferred customized mappings.

19 Claims, 11 Drawing Sheets

```
           INPUT           OUTPUT
400
           RIGHT
             Top (1R).............nose up
             Rightmost (2R)......steer right
             Bottom (3R).........nose down
             Leftmost (4R)........fire bullet CENTER
             Top (1C)..............pause
             Bottom (2C)..........resume LEFT
             Top (1L).............shield
             Rightmost (2L)......fire missile
             Bottom (3L).........evade
             Leftmost (4L)........steer left
```

(56) References Cited

U.S. PATENT DOCUMENTS

| | | | |
|---|---|---|---|
| 7,275,987 | B2 | 10/2007 | Shimakawa et al. |
| 7,452,268 | B2 | 11/2008 | Annunziata |
| 7,758,424 | B2* | 7/2010 | Riggs et al. .................... 463/37 |
| 8,142,286 | B2* | 3/2012 | Sayyadi et al. ................ 463/37 |
| 2002/0184500 | A1 | 12/2002 | Maritzen et al. |
| 2005/0132014 | A1* | 6/2005 | Horvitz et al. ............... 709/206 |
| 2005/0239524 | A1* | 10/2005 | Longman et al. ................ 463/9 |
| 2006/0097453 | A1* | 5/2006 | Feldman et al. .............. 273/304 |
| 2006/0136964 | A1* | 6/2006 | Diez et al. ...................... 725/37 |
| 2006/0287086 | A1 | 12/2006 | Zalewski et al. |
| 2008/0001786 | A1 | 1/2008 | Lutnick et al. |
| 2008/0300061 | A1* | 12/2008 | Zheng ............................ 463/42 |
| 2009/0005138 | A1* | 1/2009 | Stamper et al. .................. 463/1 |
| 2009/0106266 | A1* | 4/2009 | Donatelli ............ G06F 16/9577 |
| 2009/0163175 | A1* | 6/2009 | Shi et al. ...................... 455/411 |
| 2010/0041479 | A1* | 2/2010 | Hsu ................................ 463/36 |
| 2010/0075756 | A1* | 3/2010 | Roberts et al. ................ 463/39 |

OTHER PUBLICATIONS

International Preliminary Report on Patentability of PCT/US2010/055177, dated Jun. 12, 2012.
Chinese Office Action in Chinese Application No. 201080063419.1, dated Jan. 6, 2014.
Chinese Office Action with Search Report in Chinese Application No. 201080063419.1, dated Sep. 18, 2014.

* cited by examiner

400

| INPUT | OUTPUT |
|---|---|
| RIGHT | |
| Top ($1_R$) | nose up |
| Rightmost ($2_R$) | steer right |
| Bottom ($3_R$) | nose down |
| Leftmost ($4_R$) | fire bullet |
| | |
| CENTER | |
| Top ($1_C$) | pause |
| Bottom ($2_C$) | resume |
| | |
| LEFT | |
| Top ($1_L$) | shield |
| Rightmost ($2_L$) | fire missile |
| Bottom ($3_L$) | evade |
| Leftmost ($4_L$) | steer left |

FIG. 4A

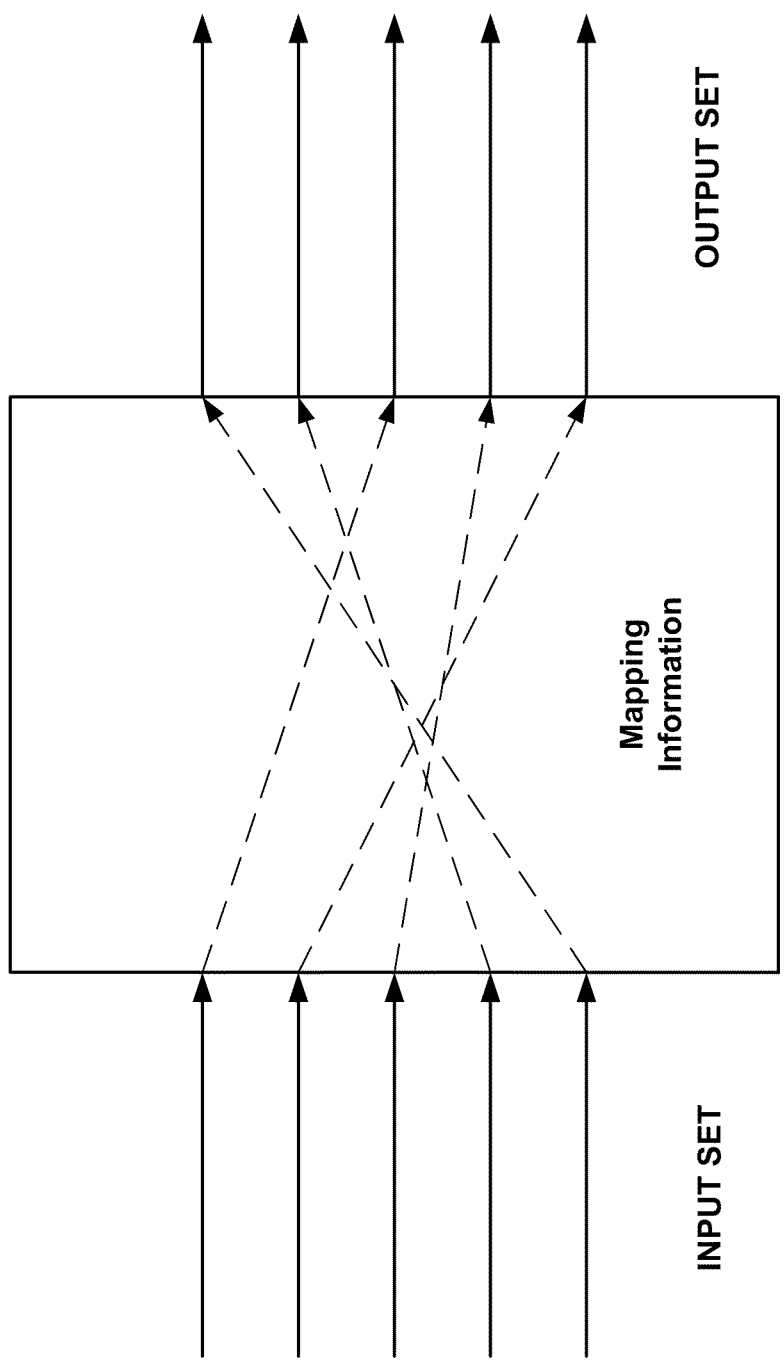

PORTABLE GAME CONTROLLER SETTINGS

TECHNICAL FIELD

The present disclosure relates generally to game controllers having customizable settings.

BACKGROUND

Game controllers, such as joysticks and the like, are typically employed by a user to input commands and information to gaming software that is being executed locally on a game console, or remotely, on a server, over a network. The commands that the user inputs through the game controller may be employed by the gaming software to manipulate an object that is being displayed to the user. An example of this is a car racing game, in which the game controller is used to steer a displayed race car along a displayed racetrack.

A game controller typically has a multiplicity of buttons, switches, knobs and the like that are actuatable by the user for issuing the desired commands. In the race car game example, a left button of the game controller can initiate a left turn, while a right button can initiate a right turn. A right upper button can accelerate the car, and a right lower button can decelerate it. Further, a side button can restart the game, and another side button can pause it, while still other buttons and switches can turn on or off various game effects relating to sounds, vibrations, visual effects, and so on. Buttons may also be used to fire projectiles or bullets at other cars, depending on the type of game. They may also be used to input information, during appropriate modes, such as customization mode. Such information can include the user's name or pseudonym and the like.

The effect of the buttons, switches and knobs of the game controller is typically dictated by the gaming software and is specific to the particular game being played. In some instances, however, the effects of these buttons, switches and knobs can be programmable in accordance with user preference. A left-handed player who may thus prefer the reverse configuration of a right-handed player, for some or all of the game controller buttons, switches and knobs, may be able to program the controller so that its buttons, switches and knobs produce different effects than a default configuration more suitable to a right-handed player. For instance, the left-handed player may prefer that projectile firing be initiated using a left-side button rather than a right-side button. Once customization is completed, the game can be played, and the controller will behave in the programmed fashion in accordance with the user preference. Such a configuration may be stored by the game controller for retrieval when the player activates that particular game with that particular game controller. The programming typically requires a specially-designed, programmable controller that the user is restricted to if customized controller settings are desired. In other words, the user must bring the programmable controller with him/her when changing play locations, such as from his/her own house to that of a friend or other location.

Because of the popularity and ubiquity of computer games, a player often has the opportunity to play the same game at various different locations—the player's own house, the house of a neighbor, or a public location, for instance—using the same or a different game controller at each location. In the case of the different game controller, that game controller may be the same model that the player is accustomed to, and therefore have the same button, switch and knob layout, or it can be different model with a different layout. In any case, it would be desirable for the player to preserve the preferred button behavior for a game controller, regardless of which game controller is being used, regardless of the platform (that is, host game console or remote server), and regardless of the particular game that is being played. In effect, it would be desirable to have portable game controller settings that a user can apply irrespective of location, game controller, platform, gaming software, or other constraints.

OVERVIEW

As described herein, a gaming system includes a controller settings store configured to store mapping information that maps an input set of game controller commands to an output set of game controller commands, the mapping information being configurable by a user, and a processor configured to run gaming software based at least partially on the output set of game controller commands.

Also as described herein, a gaming system includes a translator configured to convert a set of game controller commands issued by a game controller to a set of translated commands, and a processor configured to run gaming software based on the game controller commands in a first mode, and based on the translated commands in a second mode.

Also as described herein, a method for implementing game controller mapping information portability includes generating mapping information that maps an input set of commands for a first game controller to an output set of commands for the first game controller, and applying the mapping information to a second game controller to map an input set of commands for the second game controller to an output set of commands for the second game controller.

Also as described herein, a device for implementing game controller mapping information portability includes means for generating mapping information that maps an input set of commands for a first game controller to an output set of commands for the first game controller, and means for applying the mapping information to a second game controller to map an input set of commands for the second game controller to an output set of commands for the second game controller.

Also as described herein, a device includes a program storage device readable by a machine, tangibly embodying a program of instructions executable by a machine to perform a method for implementing game controller mapping information portability, the method including generating mapping information that maps an input set of commands for a first game controller to an output set of commands for the first game controller, and applying the mapping information to a second game controller to map an input set of commands for the second game controller to an output set of commands for the second game controller.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIG. 4A is a block diagram showing an example mapping for a ten-button controller.

FIG. 4C is a diagrammatical view of example input-to-output game controller command mappings as implemented by the mapping information, with the input set of game controller commands being re-mapped as to achieve the output set.

DESCRIPTION OF EXAMPLE EMBODIMENTS

Example embodiments are described herein in the context of devices, system of computers, servers, and software. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Figure 1:
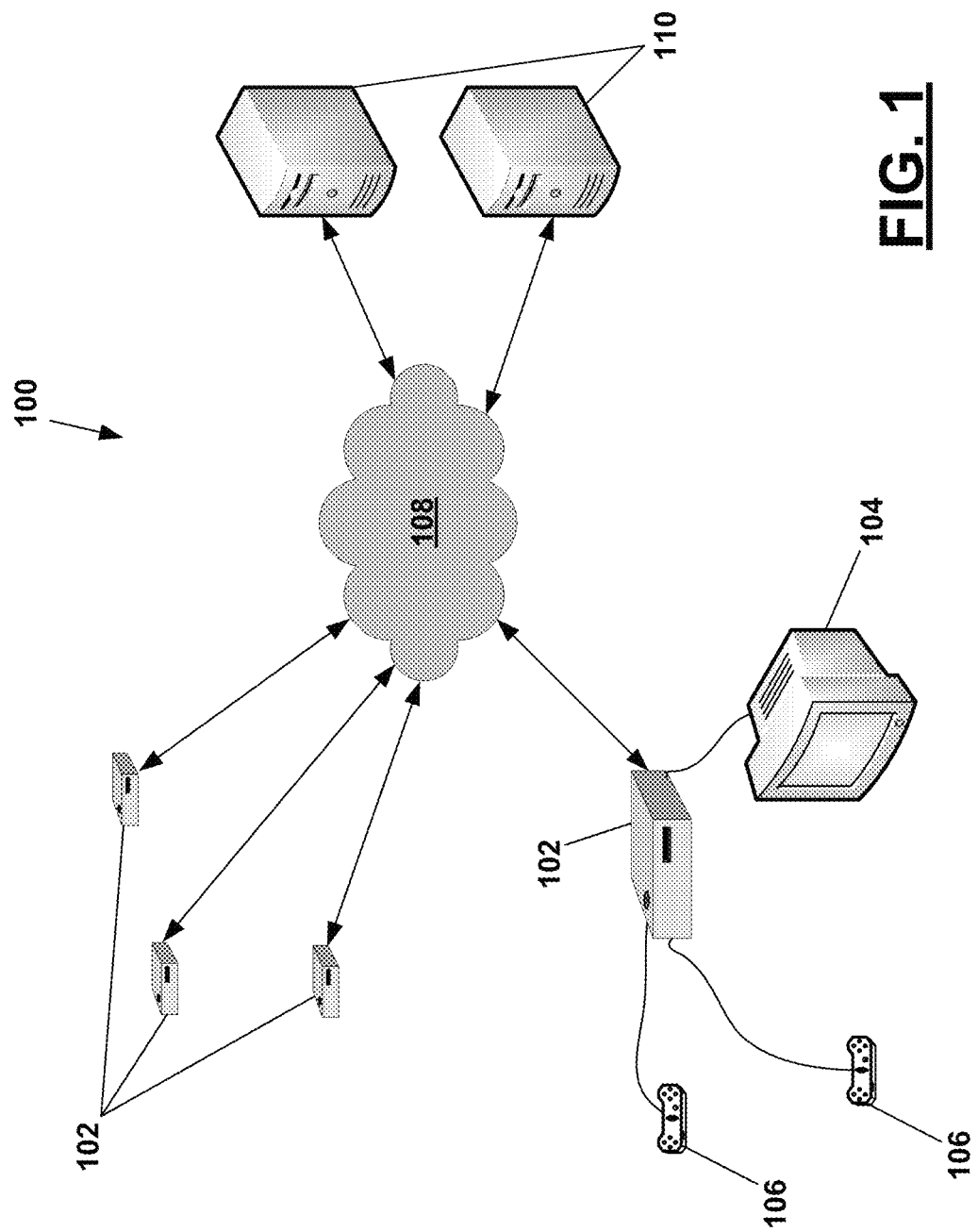
FIG. 1 is a schematic diagram of a gaming system 100 in which a computer game can be played over a network.

FIG. 1 is a schematic diagram of a gaming system 100 in which a computer game (or "video game") can be played over a network. System 100 includes one or more game consoles 102 each connected to a monitor 104 and to one or more game controllers 106. The monitor 104 may be a CRT (cathode ray tube), FPD (flat panel display) or similar visual output, or similar device configured to graphically display objects on a screen, or to project objects on a surface such as a wall, as is known in the art. As explained in more detail below with respect to FIG. 2, the console 102 may include a local processor or similar processing hardware of any computational capacity, coupled to other support components such as dedicated co-processors, storage memories, readable media drives, buses, I/O controllers, network interfaces, and the like. Console 102 may optionally be connected, over a network 108 (for example the Internet), to one or more servers 110 disposed at a location remote from the console, to conduct information exchange therewith according to known protocols so that an online gaming session can be executed. Alternatively, console 102 may be a free-standing device requiring no network connections, with the gaming software being run exclusively on the local processor therein, and the only external connections to the console being to a monitor and to the game controllers. Such operation is referred to stand-alone gaming, to be distinguished from online gaming. It is also contemplated to connect console 102 with other, local devices, for example other consoles, either directly or through local networks.

Figure 2:
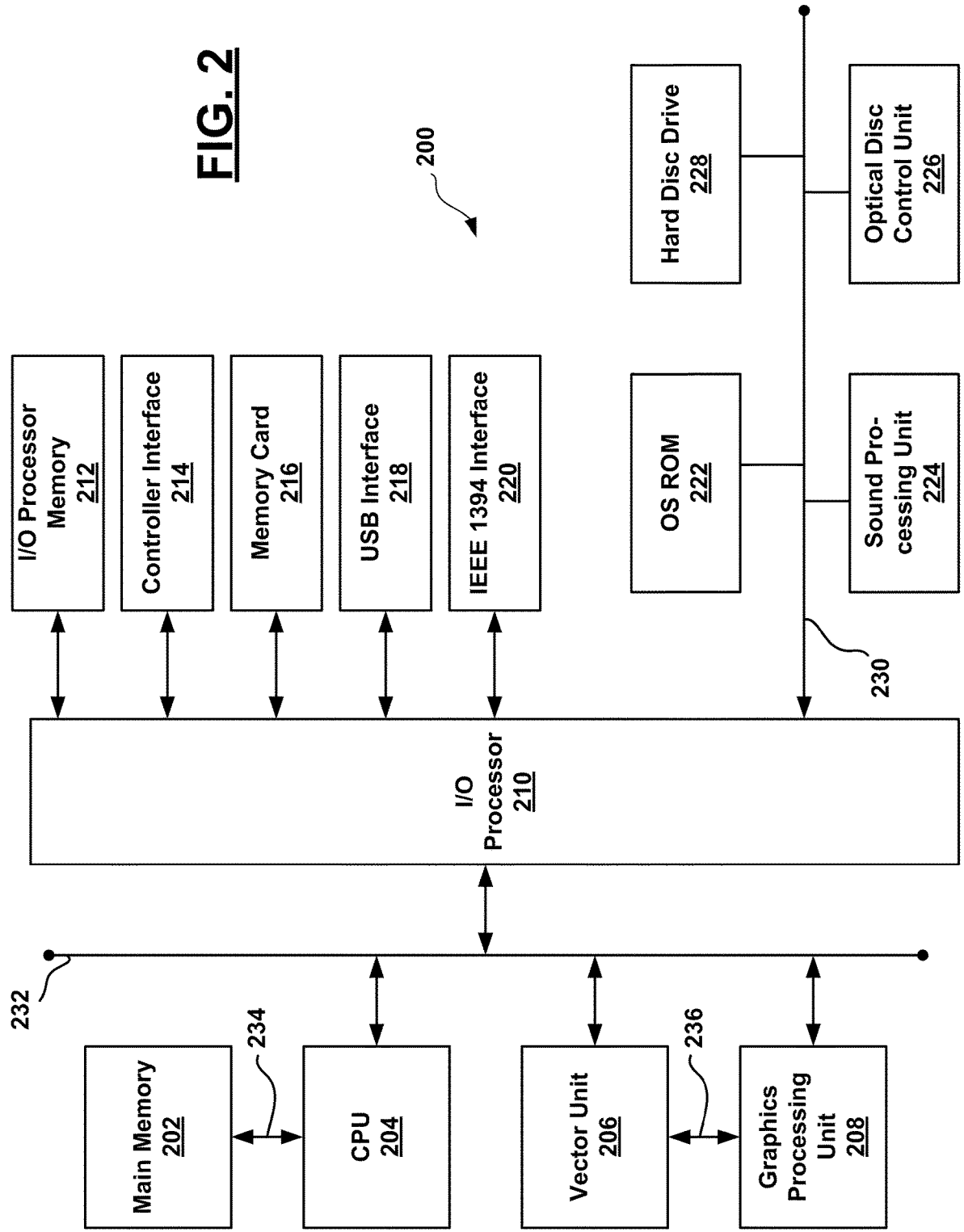
FIG. 2 is a block diagram of an exemplary electronic entertainment system as may comprise a typical console.

FIG. 2 is a block diagram of an exemplary electronic entertainment system 200 as may comprise a typical console such as console 102 above. The terms "electronic entertainment system 200" and "console 102" are used interchangeably herein. The electronic entertainment system 200 includes a main memory 202, a central processing unit (CPU) 204, at least one vector unit 206, a graphics processing unit 208, an input/output (I/O) processor 210, an I/O processor memory 212, a controller interface 214, a memory card 216, a Universal Serial Bus (USB) interface 218, and an IEEE 1394 interface 220, although other bus standards and interfaces may be utilized. The entertainment system 200 further includes an operating system read-only memory (OS ROM) 222, a sound processing unit 224, an optical disc control unit 226, and a hard disc drive 228, which are connected via a bus 230 to the I/O processor 210. While the entertainment system 200 is a form of an electronic gaming console as described above, it may alternatively be implemented as a general-purpose computer, a set-top box, or a hand-held gaming device. Further, similar entertainment systems may contain more or less operating components.

The CPU 204, the vector unit 206, the graphics processing unit 208, and the I/O processor 210 communicate via a system bus 232. Further, the CPU 204 communicates with the main memory 202 via a dedicated bus 234, while the vector unit 206 and the graphics processing unit 208 may communicate through a dedicated bus 236. The CPU 204 executes programs stored in the OS ROM 222 and the main memory 202. The main memory 202 may contain pre-stored programs and programs transferred through the I/O Processor 210 from a CD-ROM, DVD-ROM, micro SD™ device, or other optical disc (not shown) using the optical disc control unit 226. The I/O processor 210 primarily controls data exchanges between the various devices of the entertainment system 200 including the CPU 204, the vector unit 206, the graphics processing unit 208, and the controller interface 214.

The graphics processing unit 208 executes graphics instructions received from the CPU 204 and the vector unit 206 to produce images for display on a display device such as monitor 104 (FIG. 1). For example, the vector unit 206 may transform objects from three-dimensional coordinates to two-dimensional coordinates, and send the two-dimensional coordinates to the graphics processing unit 208. Furthermore, the sound processing unit 224 executes instructions to produce sound signals that are outputted to an audio device such as speakers (not shown).

A user of the entertainment system 200 provides instructions via the controller interface 214 to the CPU 204. For example, the user may instruct the CPU 204 to store certain game information on the memory card 216 or instruct a character in a game to perform some specified action. Other devices may be connected to the entertainment system 200 via the USB interface 218 and the IEEE 1394 interface 220.

Figure 3:
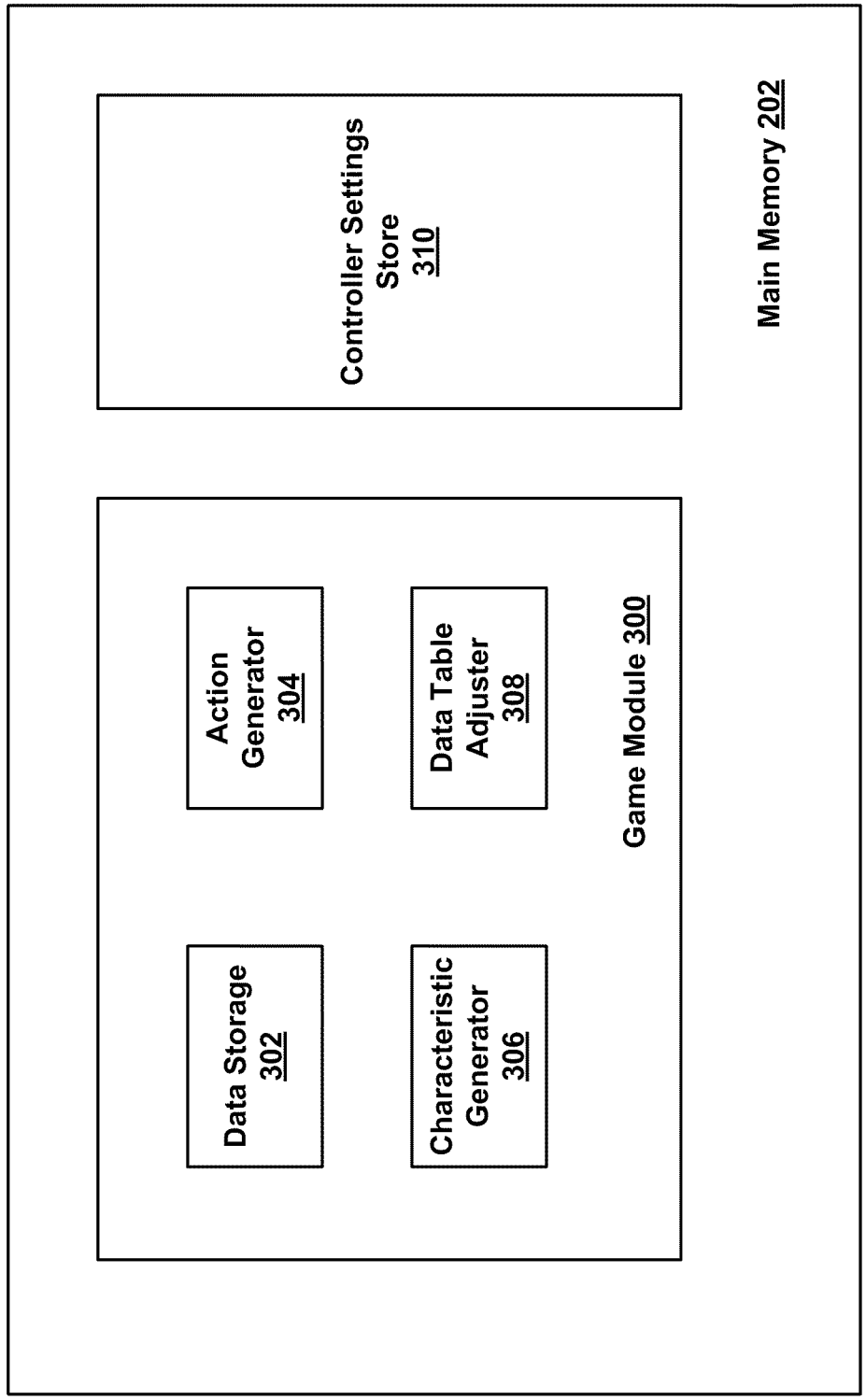
FIG. 3 is a block diagram of one embodiment of the main memory of an exemplary electronic entertainment system.

FIG. 3 is a block diagram of one embodiment of the main memory 202 of FIG. 2. The main memory 202 is shown containing a game module 300 which is loaded into the main memory 202 from an optical disc in the optical disc control unit 226 (FIG. 1), although the loading can be from other media readers, or by a download from a remote server over the Internet, or by download from local devices directly or over a local network, as explained above. The game module 300 contains instructions executable by the CPU 204, the vector unit 206, and the sound processing unit 224 of FIG. 2 that allow a user of the entertainment system 200 (FIG. 2) to play a game. In the exemplary embodiment of FIG. 3, the game module 300 includes data storage 302, an action generator 304, a characteristic generator 306, and a data table adjuster 308.

In one embodiment, the action generator 304, the characteristic generator 306, and the data table adjuster 308 are software modules executable by the CPU 204. For example, the action generator 304 is executable by the CPU 204 to produce game play, including character motion and character response; the characteristic generator 306 is executable by the CPU 204 to generate a character's expressions as displayed on a monitor (not shown); and the data table adjuster 308 is executable by the CPU 204 to update data in data storage 302 during game play. In addition, the CPU 204 accesses data in data storage 302 as instructed by the action generator 304, the characteristic generator 306, and the data table adjuster 308.

Also contained in main memory 202, as seen in FIG. 3, is a controller settings store 310, which contains mapping information enabling customized mapping of game controller buttons based on user preference. The mapping information can be input by a user into controller settings store 310 in any convenient manner, such as through the game controller 106, through transfer from another local or remote device via direct connection, wirelessly, local network, USB or Internet. The mapping information can also be input into controller settings store 310 by way of a readable medium on which the mapping information is stored. The readable medium can be any of the media that are readable by the electronic entertainment system 200, such as CD-ROM, DVD-ROM, micro SD™ device, or other optical disc type device.

The mapping information in controller settings store 310 is not necessarily game-specific, but can instead be applicable to a variety of games that may share some common commands. It will be appreciated that while mapping information is shown as stored in main memory 202 (FIG. 2) of electronic entertainment system 200, it can also be stored in other local storage devices, such as a hard disk drive 228, which may be internal or external. In addition, since the mapping information is not game-specific, its storage in locations other than that of electronic entertainment system 200 is contemplated. Examples of such other locations include, but are not limited to, any of the readable media described above, such as CD-ROMs, DVD-ROMs, micro SD™ devices, or other optical discs, magnetic disks and related media.

The mapping information can additionally or alternatively be stored in a remote memory device, such as a memory of remote server 110 in FIG. 1, or similar memory device, such as a hard disk drive, associated with the remote server. The mapping information can then be accessed over the network 108 from any one of the multiple consoles 102 of a system such as system 100 in FIG. 1. In this manner, the user gains portability of the customized game controller settings and independence from the game controller and console, so that the user no longer needs to bring his/her own game controller and/or console to each location at which he/she wishes to play.

Figure 4B:
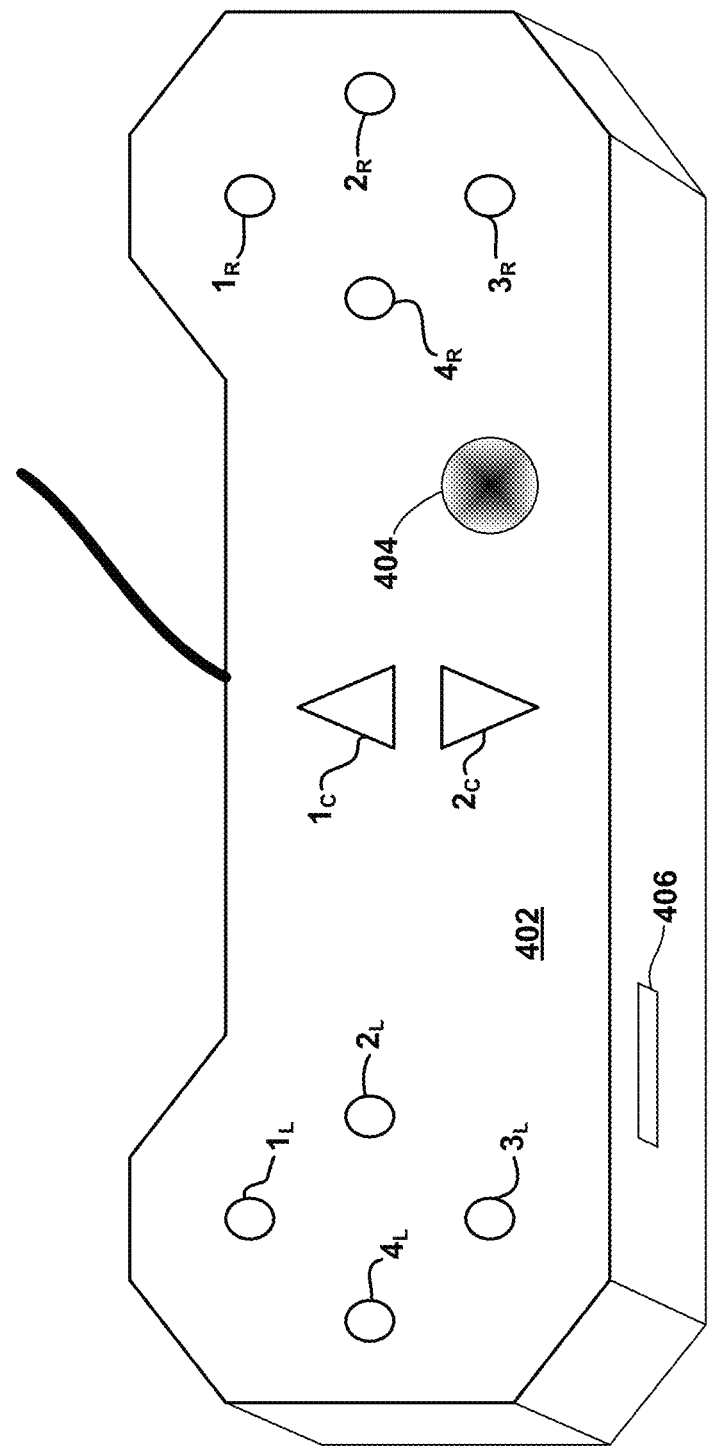
FIG. 4B is a diagram of the ten-button controller of FIG. 4A.

FIG. 4A is a block diagram showing an example mapping 400 for a ten-button controller 402 illustrated in FIG. 4B. The buttons of controller 402 are divided into three clusters: right, center and left. The four buttons of the right cluster are labeled $1_R$, $2_R$, $3_R$ and $4_R$. The two buttons of the center cluster are labeled $1_C$ and $2_C$. The four buttons of the left cluster are labeled $1_L$, $2_L$, $3_L$ and $4_L$. The mapped functionalities of these buttons are shown in FIG. 4A. FIG. 4C provides a diagrammatical illustration of example input-to-output game controller command mappings as implemented by the mapping information, with the input set of game controller commands being re-mapped as indicated to achieve the output set. It is not necessary that all controller buttons be mappable, and controllers with more or less than ten buttons are contemplated. The term "button" is being used herein to refer to buttons as illustrated, but can also refer to switches, knobs, joysticks and the like (not shown), without limitation. FIG. 4B also shows a biometrics reader 404 and a readable media slot 406, discussed in greater detail below.

Figure 5:
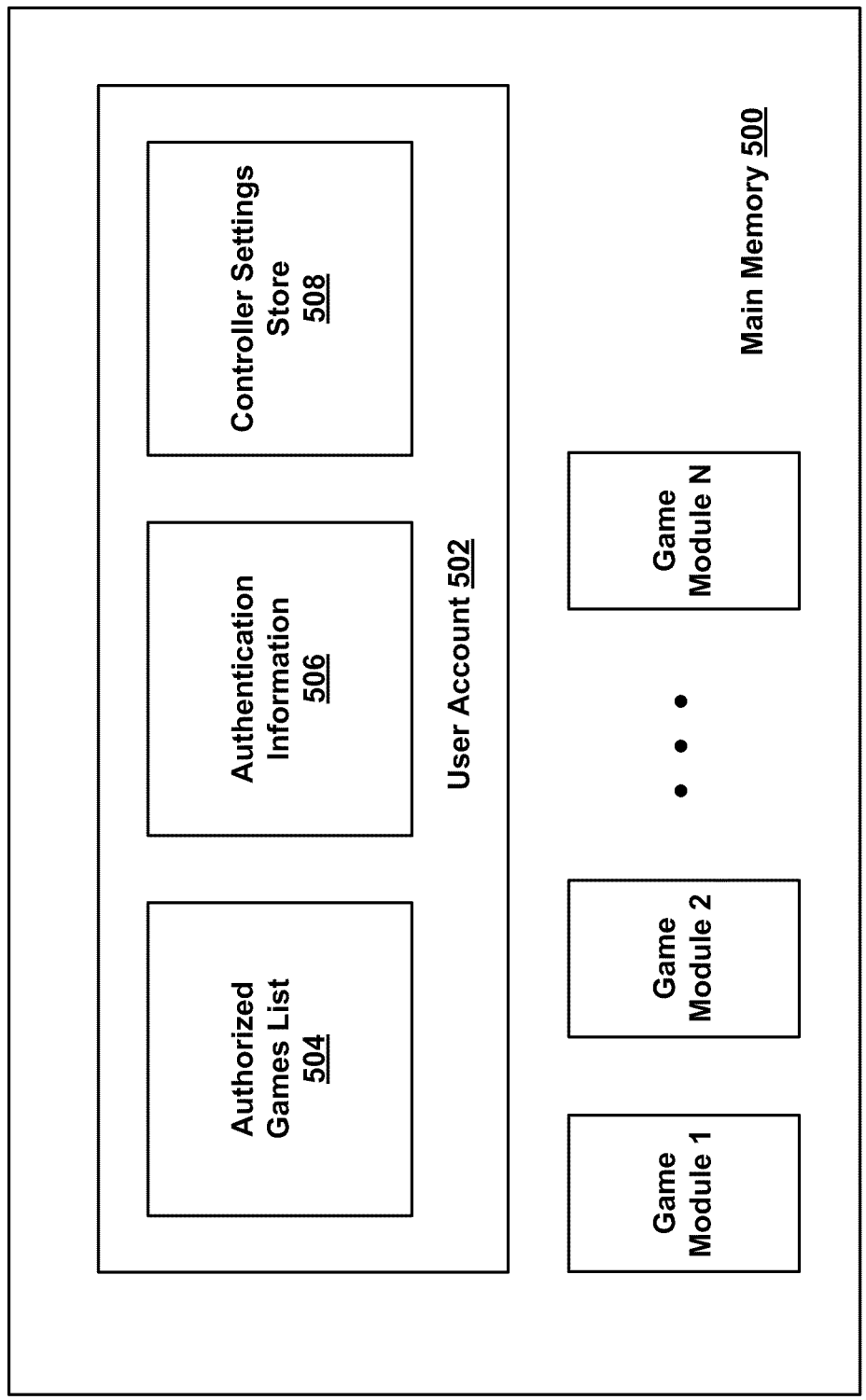
FIG. 5 is a block diagram of main memory of a remote server such as server 110 of FIG. 1.
Figure 7:
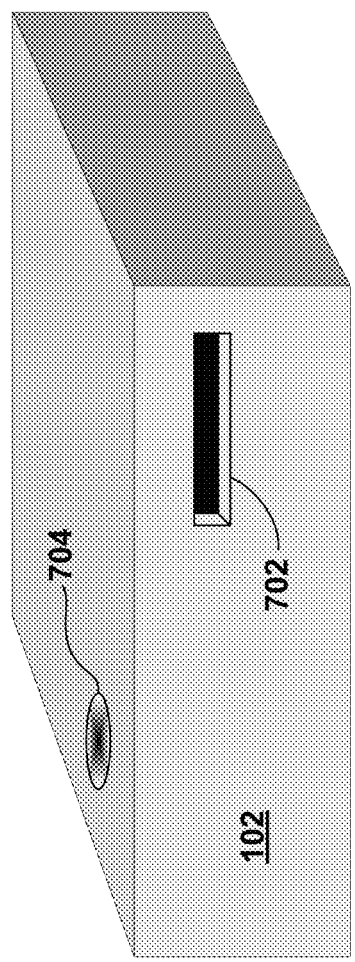
FIG. 7 is a diagrammatical view of a console shown to include a slot for insertion of a readable media bearing device.

FIG. 5 is a block diagram of main memory 500 of a remote server such as server 110 of FIG. 1. Main memory 500 includes various modules that are accessed and run by the server CPU (not shown) during an online gaming session. Among these are game modules labeled Game Module 1, Game Module 2 through Game Module N, and a user account module 502 that may be associated with a specific user. User account module 502 is used to store for instance an authorized games list 504 to which the user may have access, since the remote server may control and manage multiple accounts of multiple users. User account module 502 also stores authentication information of the user, to ascertain the user's identity and restrict access. The authentication information is stored in an authentication information module 506 and can include a user name or password through which access to the specific user account is gained. Alternatively or in addition, user biometric information can be used to provide access to the account. Such biometric information can be obtained through a sensor (404, FIG. 4; 704, FIG. 7) provided on the game controller or the console, or a stand-alone biometric sensor (not shown). The biometric sensors 404, 704, can be one or more fingerprint readers configured to extract fingerprint information unique to a user, or retinal or facial scanners, or similar devices.

Returning to FIG. 5, user account module 502 also includes controller settings store 508 containing game controller mapping information customized by the user based on his/her own preferences. Thus, once the user is authenticated, either through name and password or through biometric information or through any other authentication protocol, the user's mapping information stored in controller settings store 508 is automatically retrieved for implementation, with or without prompting from the user, in the manner detailed below. The mapping information can initially be input into controller settings store 508 in any convenient manner, such as locally through a game controller and console 102 at any location, then uploaded over the network 108 to the server 110. Inputting through the console 102 does not have be performed via a game controller, however, as other means are contemplated, including but not limited to a readable medium on which the mapping information can be stored. The readable medium can be any of the media that are readable by electronic entertainment system 200, such as CD-ROM, DVD-ROM, micro SD™ device, or other optical disc type device. A slot (702, FIG. 7) providing access to a reader (not shown) can be provided on the console. The mapping information can also be transferred from one console or portable device to another by way of a direct connection, wirelessly, by local network, USB or Internet, then uploaded to the remote server 110. In addition, while storage at the remote server site is shown to be main memory 500, other storage means are contemplated, including dedicated storage servers (not shown) at the same or a different physical or virtual location, hard disk drives that are optical or magnetic, or the like, and these can be at the same or a different physical or virtual location as the remote server 110.

Figure 6:
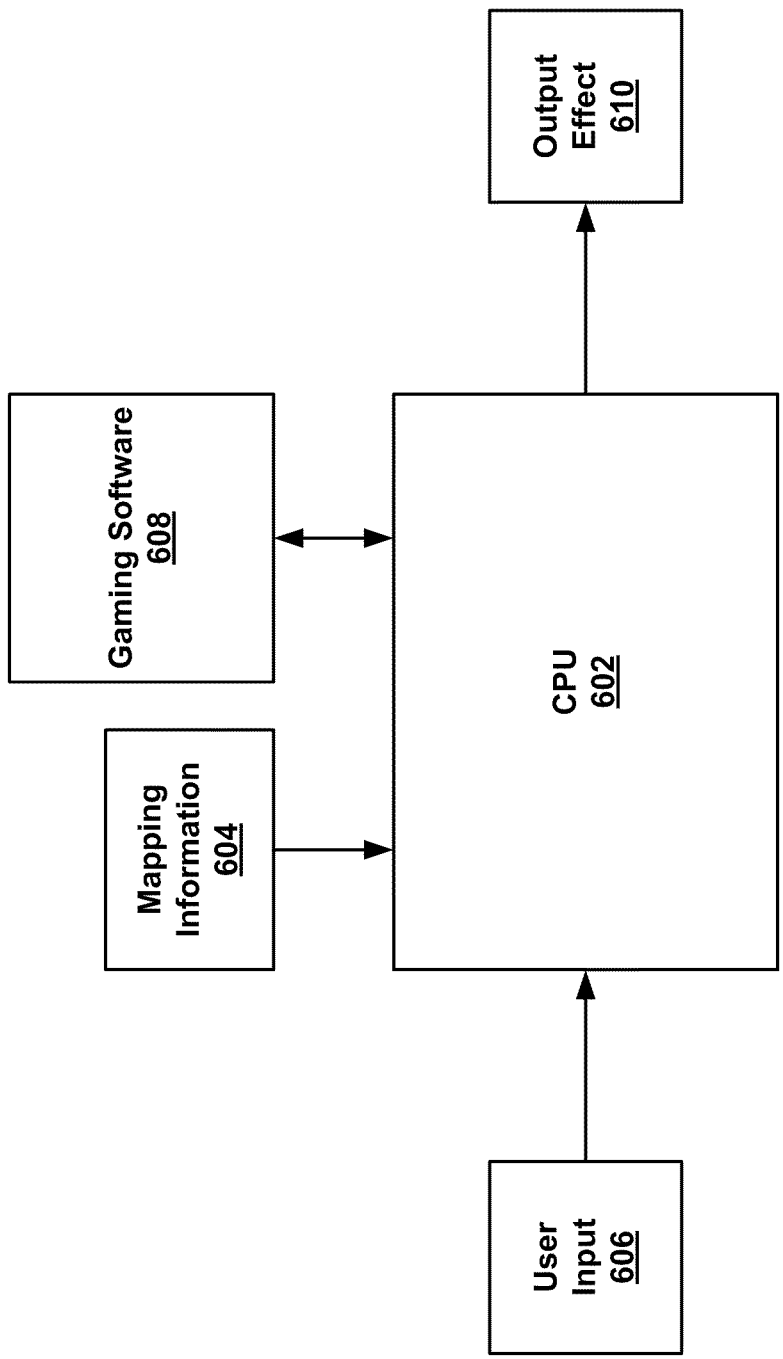
FIG. 6 is a flow diagram showing the general manner in which mapping information is used in a gaming session.

FIG. 6 is a flow diagram showing the general manner in which mapping information is used by the CPU of either server 110 in a remote online gaming session, or of game console 102 in a stand-alone gaming session. CPU 602 interacts with and runs gaming software 604 during game operation. CPU 602 receives user input 606, provided through a game controller (not shown). CPU 602 accesses mapping information 608 and interprets the user input 606 based on this mapping information. This interpretation is used in conjunction with the gaming software 604, and is used to generate game effects 610 that are output by the CPU 602. In this manner, the mapping information 608, which is based on user preference, is used to determine the gaming effects 610.

As explained above, the mapping information can be stored either locally, in main memory 202 (FIG. 2) of electronic entertainment system 200 or similar local storage, or it can be stored remotely, in a memory of remote server 110 or like device. It is also contemplated that the mapping information can be stored in the game controller itself, or in a portable memory format such as a writable disk, a micro SD™, flash Memory Stick™, or the like, that the user can transport to the different locations at which he or she wishes to play. The user then provides this information to a suitably-equipped controller or console into which the portable memory device is docked so that the desired controller configuration can be implemented. Controller 102 shown in FIG. 4 thus can include a slot 406 into which a portable memory device is inserted for reading by a reader (not shown) in the console for extraction of the mapping information. Similarly, with reference to FIG. 7, a diagrammatical view of a console 102 is shown to include a slot 702 for insertion of a readable media bearing device, such as a microSD™ device or similar memory card. The readable media bearing device contains the game controller settings customization information as described herein. The console 102 also includes a biometric reader 704, which can for instance read the user's fingerprint and perform an authentication analysis to ascertain an authorized user. Alternatively, it can be retinal scanner configured to extract unique user-identifying retinal information.

It is also possible to package the mapping information as a code word that the user can input at the beginning of play. That code word can be a shorthand representation of the some or all of the preferred controller settings for the user. The code word is then keyed into the console or remote server, for example using the game controller in a code word entry mode, for deciphering by the console or remote server and deriving the mapping information and controller settings therefrom. This would eliminate the need for the user to bring his/her own game controller, and/or have to rely on an expensive programmable game controller. As an example, a 16-button controller would use 8 bytes of storage per configuration, easily represented by 16 hexadecimal digits, each digit reflecting one nibble. The buttons could be mapped with the following code word:

$$0x1032345789ABCDEF \quad (1)$$

Referring to the legend in Table 1, it can be seen that the code word (1) above reflects the switching of the "up" button to down, and the "left" button right. This is indicated, in the code word, by the reversal of the "1" and "0", and reversal of the "3" and "2".

TABLE 1

| Button-to-Hex Digit Legend | | |
|---|---|---|
| Up (0) | Down (1) | |
| Left (2) | Right (3) | |
| L1 (4) | L2 (5) | L3 (6) |
| R1 (7) | R2 (8) | R3 (9) |
| Square (A) | Triangle (B) | |
| Circle (C) | Square (D) | |
| Select (E) | Start (F) | |

Figure 8:
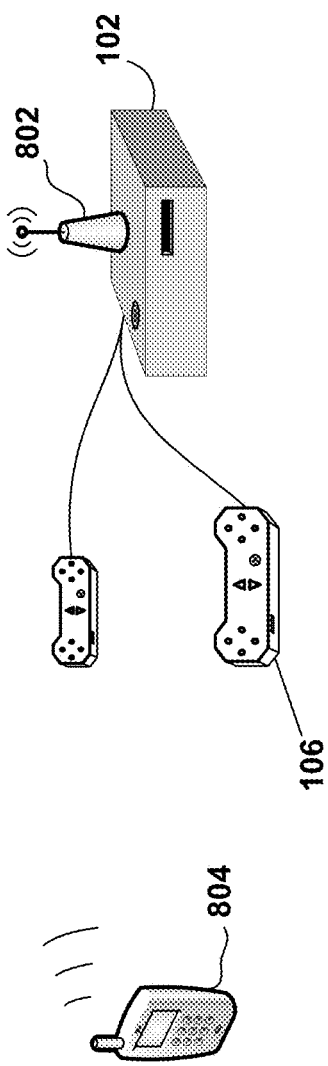
FIG. 8 is a diagrammatical view of a console equipped with a wireless antenna for receiving mapping information from a cellular telephone.

In accordance with one aspect, the mapping information is stored in a portable electronic device, for example a PDA (personal digital assistant), cellular telephone, laptop, notebook, or the like, and then transmit this information wirelessly, for example by Bluetooth™, to a console or game controller that the user wishes to use. In this manner, the user only needs to bring his/her portable electronic device, again obviating the need for the user to bring his/her own game controller, and/or have to rely on an expensive programmable game controller. Such a configuration is shown in FIG. 8, which depicts a console 102 equipped with a wireless antenna 802 for receiving the mapping information from a cellular telephone 804.

Figure 9:
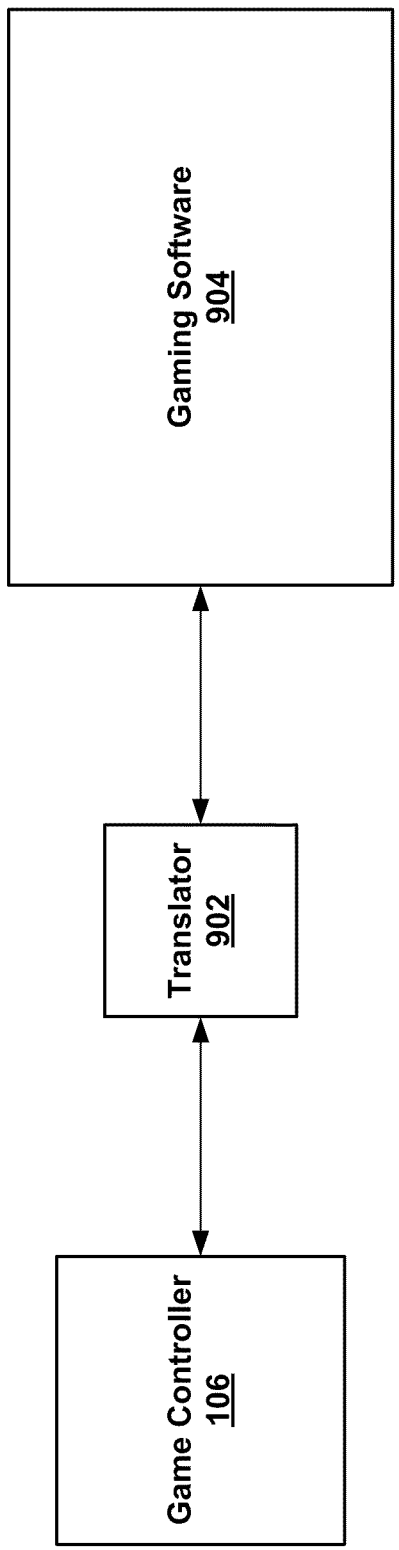
FIG. 9 is a block diagram showing re-mapping performed by a translator device interposed between a controller and gaming software.

FIG. 9 relates to another aspect in which re-mapping is performed by a translator device interposed between the controller and the gaming software and external to the other modules and components of the system. As shown in the block diagram of FIG. 9, a translator device 902 is provided between a game controller 106 and gaming software 904. The gaming software 904 may be resident on either the console 102 or the remote server 110, as described above. Translator 902 intercepts game controller commands from game controller 106, maps these commands according to user preference, then outputs the appropriate translated commands to the gaming software 904 for implementation by the processor. The manner in which the commands are translated is determined by the user in a programming stage in which the user enters the mapping he/she wishes to be implemented. It will be appreciated that in this manner the processor would have two operational modes: one in which the translator is used and the commands from the controller are translated to other commands based on user preference, and the other in which the translator is absent and commands from the controller are acted upon directly. In the first operational mode, the console or entertainment system need not necessarily be aware of the re-configuration of the button inputs—it simply receives the outputs from the translator and acts on these as if they were being provided by the console, even though they are actually a re-mapping of the users input to the controller.

In a wired embodiment, translator 902 would receive a USB cable or the like from the game controller 106, and would then couple to the console 102 via a second USB-type connection or the like. In a wireless embodiment, translator 902 would have a wireless transceiver (not shown) for receiving commands wirelessly from game controller 106, and for transmitting translated versions of these commands wirelessly to the console 102. Of course either of these two wireless paths can instead be wired, so that only one wireless path existed. Moreover, while the discussion relates to information (commands) passing in one direction, from the controller to the gaming software, it is contemplated that bidirectional information exchanges take place. In addition, while described in terms of a physical component interposed between the controller and console, it should be recognized that the translator 902 can be a software or code module or the like, for instance disposed in the main memory of the console and possibly as part of the specific gaming software.

In some situations, a user may not be familiar with a particular game—for example, upon initial purchase or subscription—and therefore may not know what the best mapping configuration for that game should be. It would be advantageous in such a situation for the sever 110 to provide a suggested configuration map, or a choice of maps, for the user to select from. Such suggested mappings may be pre-programmed mapping sets that are associated with the particular gaming software. However, the suggested mappings may also be server-derived recommendations that are based on a historic information obtained by the server from experience with other players. The server can be configured to track the mappings of the other players and derive a common set or sets of mappings which can be offered to a new user to choose from. It is also possible use such a preferred set as a default sent when a player initially logs on to a gaming session.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A gaming system comprising:
a first game controller, wherein the first game controller has a plurality of buttons that are assigned a default set of game controller commands;
a first game console coupled to the first game controller;
a server coupled to the first game controller via the first game console over a computer network,
wherein the server includes a controller settings store, wherein the controller settings store is configured to store game controller mapping information corresponding to a user account, wherein the game controller mapping information maps the default set of game controller commands assigned to the plurality of buttons of the first game controller to a modified set of game controller commands;
a second game controller, wherein the second game controller has a plurality of buttons that are assigned the default set of game controller commands; and
a second game console coupled to the second game controller, wherein the server is coupled to the second game controller via the second game console over the computer network, wherein the second game console is configured to receive a first code, wherein the first code is a sixteen bit hexadecimal code word having a plurality of digits, wherein the plurality of digits of the first code are arranged in a first manner to map the default set of game controller commands assigned to the plurality of buttons of the second game controller to the modified set of game controller commands,
wherein in response to reception of the first code, the second game console is configured to obtain the game controller mapping information for the user account via the computer network from the server for use of the game controller mapping information by the second game controller, wherein the game controller mapping information is used to modify the default set of game controller commands assigned to the plurality of buttons of the second game controller to the modified set of game controller commands,
wherein the second game console is configured to receive a second code,
wherein the server is configured to store a mapping between the default set of game controller commands and an additional modified set of game controller commands, wherein the plurality of digits of the code are arranged in the second manner to generate the second code, wherein the second code has the plurality of digits arranged in a second manner to map the default set of game controller commands assigned to the plurality of buttons of the second game controller to the additional modified set of game controller commands,
wherein in response to reception of the second code, the second game console is configured to obtain the mapping between the default set of game controller commands and the additional modified set of game controller commands for the user account via the computer network from the server for use of the additional modified set of game controller commands by the second game controller.

2. The system of claim 1, wherein the first game console includes a processor and a gaming software.

3. The system of claim 1, wherein the game controller mapping information is provided to the server by way of a computer readable device.

4. The system of claim 1, wherein the game controller mapping information is a function of historic user preference information obtained from experience with a plurality of users.

5. The gaming system of claim 1, wherein the default set of game controller commands corresponds to a default setting of the second game controller and the modified set of game controller commands corresponds to a user-defined setting of the second game controller.

6. The gaming system of claim 1, wherein the first game console includes a slot for receiving a computer-readable medium on which the game controller mapping information is stored, wherein the first game console is configured to send the game controller mapping information to the server via the computer network.

7. The gaming system of claim 1, wherein the second game console has a biometric sensor, wherein the biometric sensor is configured to sense biometric information of a user to allow access to the user account.

8. The gaming system of claim 1, wherein the first code is configured to be keyed into the second game console.

9. The gaming system of claim 1, wherein the first code is a shorthand representation of the modified set of game controller commands, and the second code is a shorthand representation of the additional modified set of game controller commands.

10. The gaming system of claim 1, wherein the first manner is a first sequence of the plurality of digits and the second manner is a second sequence of the plurality of digits.

11. A gaming system comprising:
a first game controller, wherein the first game controller has a plurality of buttons that are assigned a default set of game controller commands;
a first game console coupled to the first game controller, wherein the first game console is configured to execute a gaming software;
a server coupled to the first game controller via the first game console and a computer network;
a second game controller, wherein the second game controller has a plurality of buttons that are assigned the default set of game controller commands;
a second game console coupled to the second game controller, wherein the second game console is configured to execute the gaming software,
wherein the server is coupled to the second game controller via the second game console and the computer network;
wherein the server includes a user account module, wherein the user account module includes a controller settings store, wherein the controller settings store is configured to store game controller mapping information corresponding to a user account, wherein the game controller mapping information maps the default set of game controller commands assigned to the plurality of buttons of the first game controller to a modified set of game controller commands, wherein the game controller mapping information maps the default set of game controller commands assigned to the plurality of buttons of the second game controller to the modified set of game controller commands,
wherein the server is configured to:
receive the game controller mapping information corresponding to the user account from the first game console;
receive a request in the user account module for initiating a game play on the second game console, wherein the request includes authentication information corresponding to the user account;
receive a first code, wherein the first code is a sixteen bit hexadecimal code word having a plurality of digits, wherein the plurality of digits of the first code are arranged in a first manner to map the default set of game controller commands assigned to the plurality of buttons of the second game controller to the modified set of game controller commands;
upon reception of the authentication information and the first code, retrieve the game controller mapping information corresponding to the user account from the controller settings store and transfer over the computer network to the second game console the game controller mapping information, wherein the game controller mapping information is transferred to the second game console for application of the game controller mapping information to the plurality of buttons of the second game controller;
store a mapping between the default set of game controller commands and an additional modified set of game controller commands,
receive a second code, wherein the plurality of digits of the second code are arranged in a second manner to map the default set of game controller commands assigned to the plurality of buttons of the second game controller to the additional modified set of game controller commands;
in response to reception of the second code, transfer over the computer network to the second game console the mapping between the default set of game controller commands and the additional modified set of game controller commands corresponding to the user account, wherein the mapping between the default set of game controller commands and the additional modified set of game controller commands is transferred to the second game console for application of the game controller mapping information to the plurality of buttons of the second game controller.

12. The gaming system of claim 11, wherein the second game console is provided access to the user account to obtain the game controller mapping information from the controller settings store.

13. The gaming system of claim 11, wherein the first game console is at a different location than the second game console.

14. The gaming system of claim 11, wherein the game controller mapping information is communicated wirelessly to the controller settings store.

15. The gaming system of claim 11, wherein the authentication information includes biometric information corresponding to a user associated with the user account.

16. The gaming system of claim 11, wherein the authentication information is fingerprint information, retinal information, facial information, or user input.

17. The gaming system of claim 11, wherein the default set of game controller commands corresponds to a default setting of the second game controller and the modified set of game controller commands corresponds to a user-defined setting of the second game controller.

18. The gaming system of claim 11, wherein the first game console includes a slot for receiving a computer-readable medium on which the game controller mapping information is stored, wherein the first game console is configured to send the game controller mapping information to the server via the computer network.

19. The gaming system of claim 11, wherein the second game console has a biometric sensor, wherein the biometric sensor is configured to sense biometric information of a user to allow access to the user account.

\* \* \* \* \*